US011052872B2

United States Patent
Lei et al.

(10) Patent No.: US 11,052,872 B2
(45) Date of Patent: Jul. 6, 2021

(54) VEHICLE COMMUNICATIONS

(71) Applicant: Ford Global Technologies, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 471 days.

(21) Appl. No.: 15/458,464

(22) Filed: Mar. 14, 2017

(65) Prior Publication Data
US 2018/0265038 A1 Sep. 20, 2018

(51) Int. Cl.
| | |
|---|---|
| *B60R 25/24* | (2013.01) |
| *H04W 4/44* | (2018.01) |
| *H04W 12/03* | (2021.01) |
| *B60R 25/20* | (2013.01) |
| *H04W 4/14* | (2009.01) |
| *H04W 40/00* | (2009.01) |
| *H04B 17/318* | (2015.01) |
| *H04L 29/12* | (2006.01) |
| *H04L 29/06* | (2006.01) |

(52) U.S. Cl.
CPC ............ *B60R 25/24* (2013.01); *B60R 25/209* (2013.01); *H04W 4/14* (2013.01); *H04W 4/44* (2018.02); *H04W 12/03* (2021.01); *H04W 40/005* (2013.01); *B60R 2325/205* (2013.01); *H04B 17/318* (2015.01); *H04L 61/6068* (2013.01); *H04L 63/0428* (2013.01); *H04L 2209/80* (2013.01); *H04L 2209/84* (2013.01)

(58) Field of Classification Search
CPC .. G07C 9/00; G07C 5/00; H04W 4/00; H04L 12/58; H04M 1/725

USPC .......... 701/31.4; 455/420, 412.1; 340/539.19
See application file for complete search history.

(56) References Cited

U.S. PATENT DOCUMENTS

| | | | |
|---|---|---|---|
| 9,332,559 B2 | 5/2016 | Pan et al. | |
| 9,587,958 B2 * | 3/2017 | Campbell | .......... G01C 21/3688 |
| 9,783,024 B2 * | 10/2017 | Connell | ............. B60H 1/00771 |
| 9,940,764 B2 * | 4/2018 | Van Wiemeersch | ..... G07C 9/28 |
| 2009/0167524 A1 * | 7/2009 | Chesnutt | ............... H04L 67/125 |
| | | | 340/539.19 |

(Continued)

OTHER PUBLICATIONS

Wikipedia, Dec. 2016, "Mobile Application Part", https://en.wikipedia.org/wiki/Mobile_Application_Part, https://web.archive.org/web/20161216063424/https://en.wikipedia.org/wiki/Mobile_Application_Part (Year: 2016).*

(Continued)

*Primary Examiner* — Peter D Nolan
*Assistant Examiner* — Wae L Louie
(74) *Attorney, Agent, or Firm* — Michael Spenner; Brooks Kushman P.C.

(57) ABSTRACT

A control system for a vehicle includes a controller configured to send a mobile application part protocol (MAPP) message to the server requesting that further commands be sent via the MAPP. The control system may send the MAPP message responsive to receiving a message containing a wakeup command from a server and being unable to establish a packet switched connection with the server. The control system may start the vehicle responsive to receiving a MAPP message from the server containing a command to start the vehicle.

16 Claims, 4 Drawing Sheets

(56) References Cited

U.S. PATENT DOCUMENTS

| | | | | |
|---|---|---|---|---|
| 2009/0247132 | A1* | 10/2009 | Sumcad | H04W 12/106 |
| | | | | 455/412.1 |
| 2011/0039556 | A1 | 2/2011 | Yi et al. | |
| 2013/0151064 | A1* | 6/2013 | Becker | G07C 5/008 |
| | | | | 701/31.4 |
| 2013/0219039 | A1 | 8/2013 | Ricci | |
| 2015/0245186 | A1* | 8/2015 | Park | H04W 4/16 |
| | | | | 455/417 |
| 2016/0094699 | A1* | 3/2016 | Shaout | H04M 1/72412 |
| | | | | 455/420 |
| 2016/0359525 | A1* | 12/2016 | Griffin | H04B 5/0031 |
| 2017/0050521 | A1* | 2/2017 | Shaw | B60K 37/06 |
| 2017/0287322 | A1* | 10/2017 | Drake | G07C 5/008 |
| 2017/0294062 | A1* | 10/2017 | Van Wiemeersch | |
| | | | | G07C 9/00309 |
| 2018/0035245 | A1* | 2/2018 | Thanayankizil | H04W 4/80 |
| 2018/0091608 | A1* | 3/2018 | Camacho | H04W 12/08 |
| 2018/0265038 | A1* | 9/2018 | Lei | H04W 4/44 |
| 2019/0030987 | A1* | 1/2019 | Li | B60H 1/008 |
| 2019/0253961 | A1* | 8/2019 | Bouvet | H04W 36/30 |

OTHER PUBLICATIONS

Wikipedia, Dec. 2016, "GPRS core network", https://en.wikipedia.org/wiki/GPRS_core_network, https://web.archive.org/web/20161216051641/https://en.wikipedia.org/wiki/GPRS_Core_Network (Year: 2016).*

* cited by examiner

VEHICLE COMMUNICATIONS

TECHNICAL FIELD

The present disclosure relates to vehicle communications.

BACKGROUND

Vehicles may be configured to receive control commands from a remote server over various communication mediums, including cellular data networks. Gradual expansion of these networks has resulted in regions where successful transmission of control commands is unattainable. Other means may be available to ensure control commands are received by the vehicles.

SUMMARY

A control system for a vehicle includes a controller configured to send a mobile application part protocol (MAPP) message to the server requesting that further commands be sent via the MAPP. The control system may send the MAPP message responsive to receiving a message containing a wakeup command from a server and being unable to establish a packet switched connection with the server. The control system may start the vehicle responsive to receiving a MAPP message from the server containing a command to start the vehicle.

A method includes receiving a wakeup command from a remote server at a controller of a vehicle. The method includes defining a connection likelihood for a plurality of packet switched connections based on a respective received signal strength and signal type. The method includes sending a first connection request using a first one of the plurality having a highest connection likelihood. The method includes sending a second connection request using a second one of the plurality having a second highest connection likelihood. The second connection request may be sent in response to being unable to establish a connection with the server over the first of the plurality. The method includes sending a mobile application part protocol (MAPP) message to the server requesting that further commands be sent via the MAPP. The MAPP message may be sent in response to being unable to establish the connection with the server over the second of the plurality. The method includes receiving a MAPP message from the server containing a command. The method includes operating the vehicle based on the command.

A control system for a vehicle includes a controller configured to send a mobile application part protocol (MAPP) message to the server requesting that further commands be sent via the MAPP. The control system sends the MAPP message responsive to receiving a message containing a wakeup command from a server and being unable to establish a packet switched connection with the server. The control system unlocks the vehicle. The control system unlocks the vehicle responsive to receiving a MAPP message from the server containing a command to unlock the vehicle.

DETAILED DESCRIPTION

Figure 1:
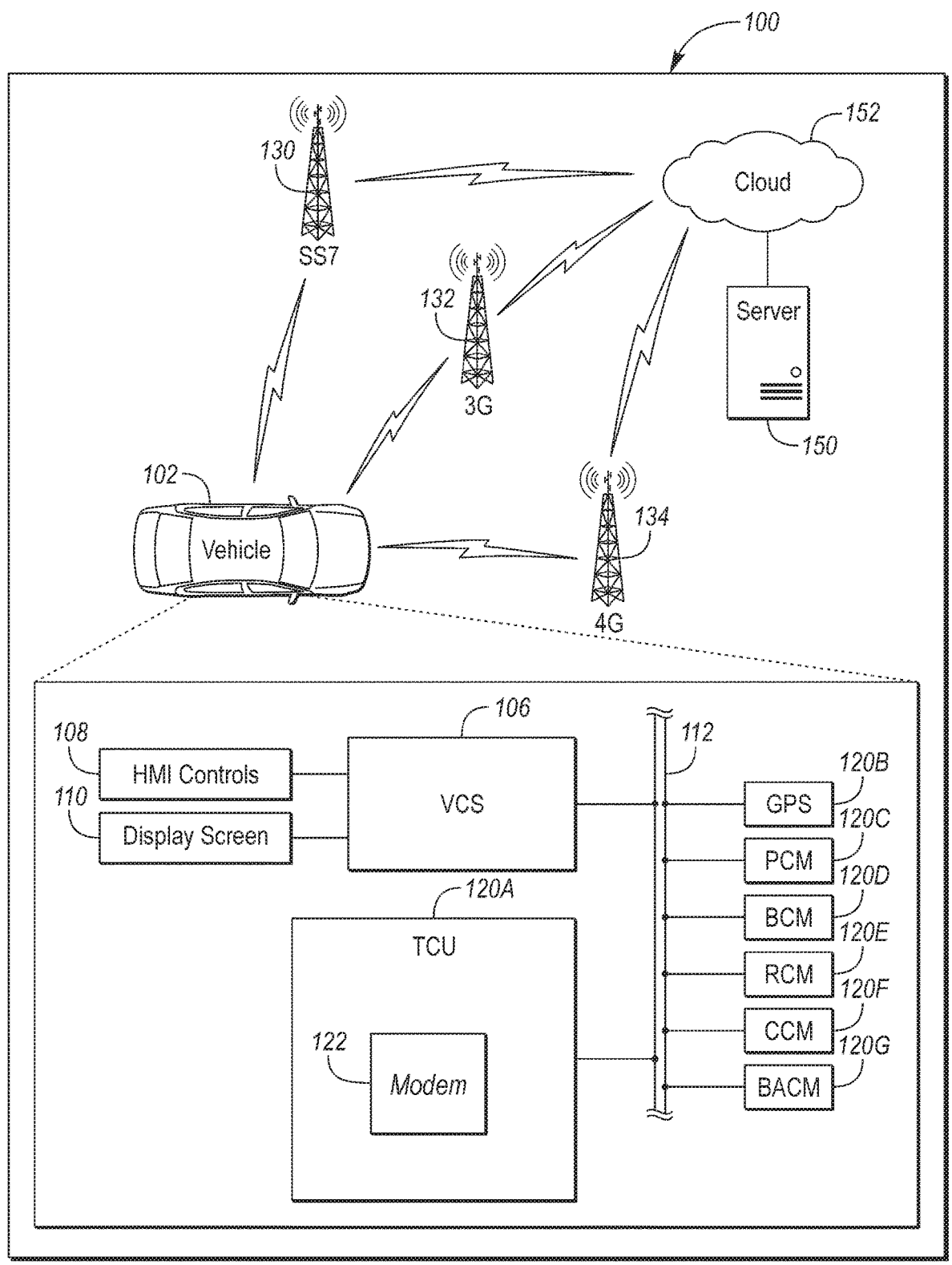
FIG. 1 illustrates an example system including a vehicle implementing a server communications strategy.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

High-speed cellular data networks have limited coverage that is continuously expanding, covering larger footprints to provide better signal reception and data throughput. Existing communications networks, however, have already established large coverage areas of accessibility with limited data transfer capacity. A vehicle telemetric device can be programmed to avoid the detrimental aspects of both the new high-speed cellular data networks and the large coverage areas of existing networks by using protocols typically unintended for data communication use.

Existing networks use out-of-band, circuit-based signaling or switching to connect cellular and other telephone systems to one another (e.g, SS7, C7, ISDN, PSTN, Circuit-Switched Data, High-Speed Circuit-Switched Data, Datakit). As vehicles move throughout the cellular coverage areas, mobile application part protocols (MAPP) are used to communicate with telecommunications infrastructure. MAPP messages provide tracking of cellular devices, SMS messaging, and subscriber authentication. Meaning, MAPP messages are predominantly used for signaling information and not user data transmission. Signaling is the exchange of information designed to connect data or voice communications, not the data or voice communications themselves.

Next generation high-speed cellular data networks use packet-based signaling or switching to connect cellular and other telephone systems to one another (e.g., LTE, 3G, 2G). As vehicles move throughout cellular coverage areas, packet-based signaling or switching is used to ensure the packets are received by the right parties in the correct order.

Although vehicles may receive commands through next generation high-speed cellular data networks, the limited coverage areas of these networks may prevent vehicles from receiving commands in locations yet to receive high-speed data coverage. MAPP messages may be unexpectedly tasked to provide these commands to vehicles when high-speed networks are unavailable.

FIG. 1 illustrates an example system 100 including a vehicle 102 implementing vehicle communications path selection. The vehicle 102 may include a vehicle computing system (VCS) 106 configured to communicate over a widearea network using a telematics control unit (TCU) 120A. The TCU 120A may have various modems 122 configured to communicate over respective communications paths and protocols. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 106 may be configured to support voice command and BLUETOOTH interfaces with the driver and driver carry-on devices, receive user input via various buttons or other controls, and provide vehicle status information to a driver or other vehicle 102 occupants. An example VCS 106 may be the SYNC system provided by FORD MOTOR COMPANY of Dearborn, Mich.

The VCS 106 may further include various types of computing apparatus in support of performance of the functions of the VCS 106 described herein. In an example, the VCS 106 may include one or more processors 108 configured to execute computer instructions, and a storage 110 medium on which the computer-executable instructions and/or data may be maintained. A computer-readable storage medium (also referred to as a processor-readable medium or storage 110) includes any non-transitory (e.g., tangible) medium that participates in providing data (e.g., instructions) that may be read by a computer (e.g., by the processor(s)). In general, a processor 108 receives instructions and/or data, e.g., from the storage 110, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The VCS 106 may be configured to communicate with TCU 120A. The TCU 120A may include a plurality of modems 122 capable of packet-switch or circuit-switched signaling. The TCU 120A may control the operation of the modems 122 such that a suitable communication path is used. The modems may be configured to communicate over a variety of communications paths. The paths may be configured with circuit-switched 130, packet-switched 132, 134 signaling, or combination thereof. Packet-switched communication 132, 134 paths may be Internet Protocol (IP)-based or use packet-based switching to transfer information. For example, the packet-switched communication may be long-term evolution (LTE) communications. In some circumstances the circuit-switch 130 communication path may be SIGTRAN or another implement, carrying circuit-switched signaling information over IP. The underlying signaling information is, however, still formatted under the circuit-switched protocol.

The VCS 106 may also receive input from human-machine interface (HMI) controls 108 configured to provide for occupant interaction with the vehicle 102. For instance, the VCS 106 may interface with one or more buttons or other HMI controls 108 configured to invoke functions on the VCS 106 (e.g., steering wheel audio buttons, a push-to-talk button, instrument panel controls, etc.). The VCS 106 may also drive or otherwise communicate with one or more displays 110 configured to provide visual output to vehicle occupants, e.g., by way of a video controller. In some cases, the display 110 may be a touch screen further configured to receive user touch input via the video controller, while in other cases the display 110 may be a display only, without touch input capabilities. In an example, the display 110 may be a head unit display included in a center console area of the vehicle 102 cabin. In another example, the display 110 may be a screen of a gauge cluster of the vehicle 102.

The VCS 106 may be further configured to communicate with other components of the vehicle 102 via one or more in-vehicle networks 112 or vehicle buses 112. The in-vehicle networks 112 may include one or more of a vehicle controller area network (CAN), an Ethernet network, and a media oriented system transfer (MOST), as some examples. The in-vehicle networks 112 may allow the VCS 106 to communicate with other vehicle 102 systems, such as a vehicle modem of the TCU 120A (which may not be present in some configurations), a global positioning system (GPS) module 120B configured to provide current vehicle 102 location and heading information, and various other vehicle ECUs configured to cooperate with the VCS 106. As some non-limiting possibilities, the vehicle ECUs may include a powertrain control module (PCM) 120C configured to provide control of engine operating components (e.g., idle control components, fuel delivery components, emissions control components, etc.) and monitoring of engine operating components (e.g., status of engine diagnostic codes); a body control module (BCM) 120D configured to manage various power control functions such as exterior lighting, interior lighting, keyless entry, remote start, and point of access status verification (e.g., closure status of the hood, doors and/or trunk of the vehicle 102); a radio transceiver module (RCM) 120E configured to communicate with key fobs or other local vehicle 102 devices; a climate control management (CCM) 120F module configured to provide control and monitoring of heating and cooling system components (e.g., compressor clutch and blower fan control, temperature sensor information, etc.); and a battery control module (BACM) 120G configured to monitor the state of charge or other parameters of the battery 104 of the vehicle 102.

In an example, the VCS 106 may be configured to access the communications features of the TCU 120A by communicating with the TCU 120A over a vehicle bus 112. As some examples, the vehicle bus 112 may include a controller area network (CAN) bus, an Ethernet bus, or a MOST bus. In other examples, the VCS 106 may communicate with the server 150 via a server modem 152 using the communications services of the modems 122, 124, 126, 128.

The server 150 may be configured to communicate to the vehicle 102 over the telecommunications networks 130, 132, 134 through the server connected to the internet, which is further connected to a cellular network backend server or cloud server 152. The server 150 may be configured to send a variety of messages over any protocol and networks requested by the vehicle. The server 150 may be configured to save the preferred protocols and networks in a database or data structure. The server 150 is then configured to communicate over the preferred networks and protocols to ensure data sent is received. The server 150 is configured to further send commands to the vehicle. The commands may be sent in standard data structures, i.e., plaintext, or using vehicle specific binary codes. The binary codes may include encrypted information. In some embodiments, the server may perform a handshake with the vehicle after a communication path is established. In other embodiments, the server may have a preconfigured set of keys to encrypt the data, and the vehicle may have the corresponding decryption keys. Salts may also be used.

Figure 2:
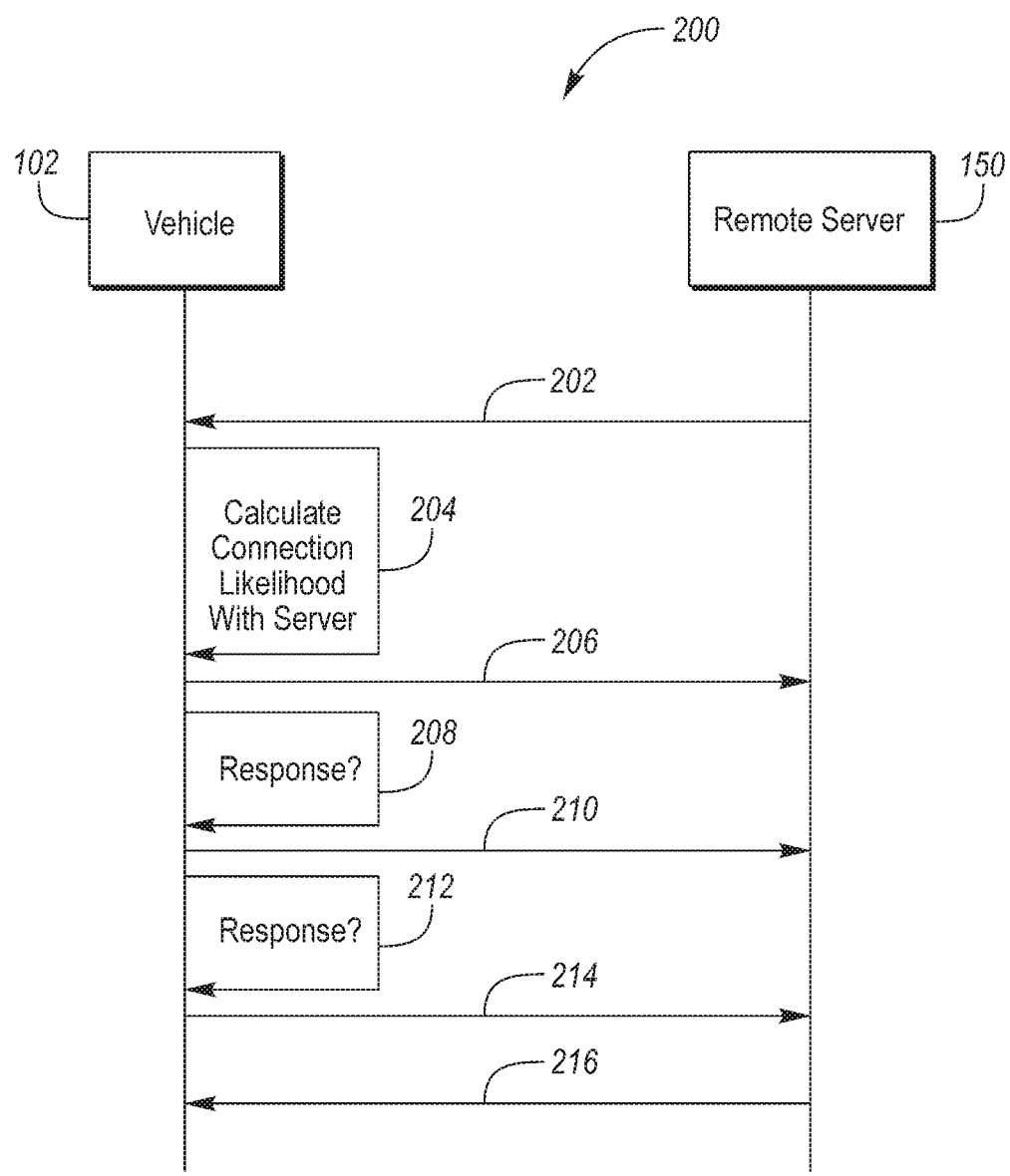
FIG. 2 illustrates an example process for performing the server communications.

FIG. 2 illustrates a process for establishing a communication path between a server 150 and a vehicle 102. For example, the vehicle 102 may receive a wakeup command 202. The wakeup command 202 may be transmitted using any protocol. The wakeup command 202 may be transmitted using a circuit-switched 130 or packet-switched 132, 134 communication path. The wakeup command 202 may be formed to fit within a limited frame or packet size. For example, the wakeup command may be limited to 140 bytes. The wakeup command may be sent in plain-text or a binary-formatted code. The wakeup command 202 may be encrypted. The command may be received by the TCU 120A through the modem and transferred to the VCS 106. The wakeup command may be a limited command with minimal functionality. For example, the wakeup command 202 may be rudimentary and be limited to operating the VCS 106 and TCU 120A at full or partial power.

In step 204, the VCU 106, TCU 120A, other controller, or combination of controllers may determine a connection likelihood. In some embodiments step 204 may occur before step 202 or following the vehicle shutdown. It should be appreciated that all steps disclosed may occur in any order. The connection likelihood may be based on a received signal strength indication (RSSI) or reference signal received signal quality (RSRQ). The connection likelihood may be specifically tailored to the communications, signal type, or radio access technology (RAT). For example, each (RAT) may have respective signal quality thresholds. CDMA may have a −90 dBm threshold. GSM may have a −85 dBm threshold. UMTS may have a −85 dBm threshold. LTE may have a −95 dBm threshold. The connection likelihood may be determined based on a ratio of the RSSI or RSRQ to the threshold for the respective RAT. For example, a −45 dBm RSSI received on LTE has a connection likelihood of 0.473 (−45 dBm/−95 dBm). If a −40 dBm RSSI is received on the GSM network—meaning a connection likelihood of 0.470 (−40 dBm/−85 dBm), the controller may attempt a connection on the LTE communication path first because the ratio is higher even though the RSSI on the LTE communication path is less. In another embodiment, the connection likelihood may be predetermined based on region or user preference (e.g., home network, equivalent network, roaming network).

In step 206, the TCU 120A may attempt a connection over the LTE communication path. A timeout in step 208 may be performed to determine whether a response from the server 150 was received. If the TCU 120A is unable to establish a connection with the server over the first of the plurality of packet-switched communication paths 132, 134, the TCU 120A may attempt to establish a connection with the server over a second communication path in step 210. If the TCU 120A is unable to establish a connection with the server 150 over the second of the plurality of communication paths 132, 134, the TCU 120A may send a MAPP message 214 to the server over a circuit-switched communication path 130. A MAPP message or mobile application part protocol message 214 is a message that was designed for signaling, but is instead used to communicate data between the vehicle 102 and server 150. In other words, the MAPP message 214 has been repurposed to communicate with the vehicle 102. In some instances, the MAPP message 214 may be a short message service (SMS) message. In other instances, the MAPP message 214 may be intended to communicate other signaling information (e.g., MAP operations, other circuit-switched signaling operations) and repurposed to communicate from or to the vehicle 102. For example, a MAPP message 214 includes a header having an operation code and length. The message following the MAPP message 214 may have commands for the vehicle 102 or instructions for the server 150. The MAPP message may a data unit with a predetermined length. The data unit length may be less than an IP or packet-switched protocol. The data unit length may be 140 bytes. Any available operation code may be used to communicate this information. The vehicle 102 may send the MAPP message 214 to the server 150, instructing the server 150 to send further communications via the repurposed mobile application part protocol. In response, the server 150 may send additional commands to the vehicle 102 with MAPP messages 216. The MAPP message 216 may have an SMS operation code and include various commands in the message package. The commands may instruct the VCS 106 to start the vehicle, lock the doors, initiate climate control, or other vehicle functions as necessary.

Figure 3:
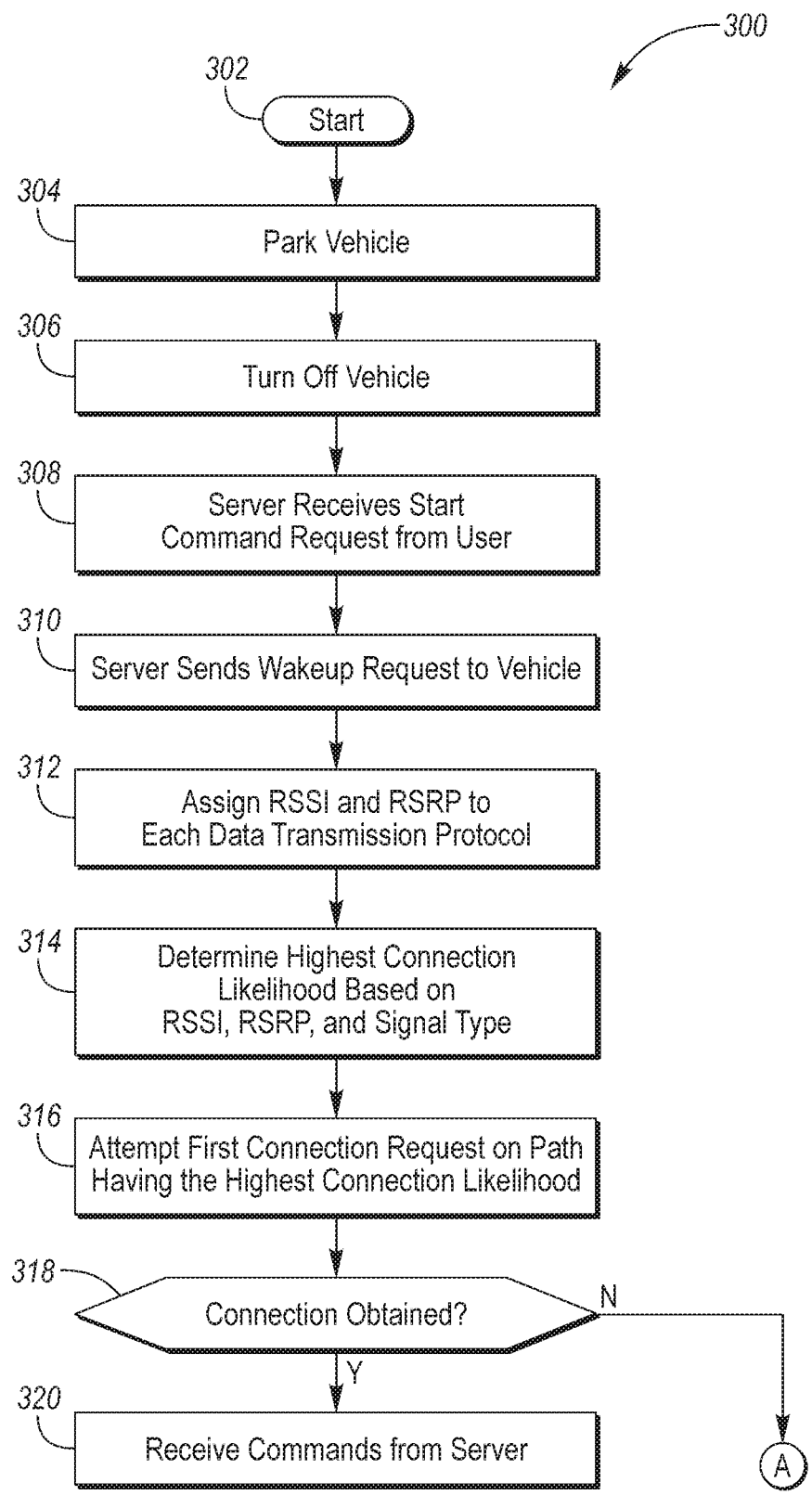
FIG. 3 illustrates an example process selecting a preferred communication path with the server.
Figure 4:
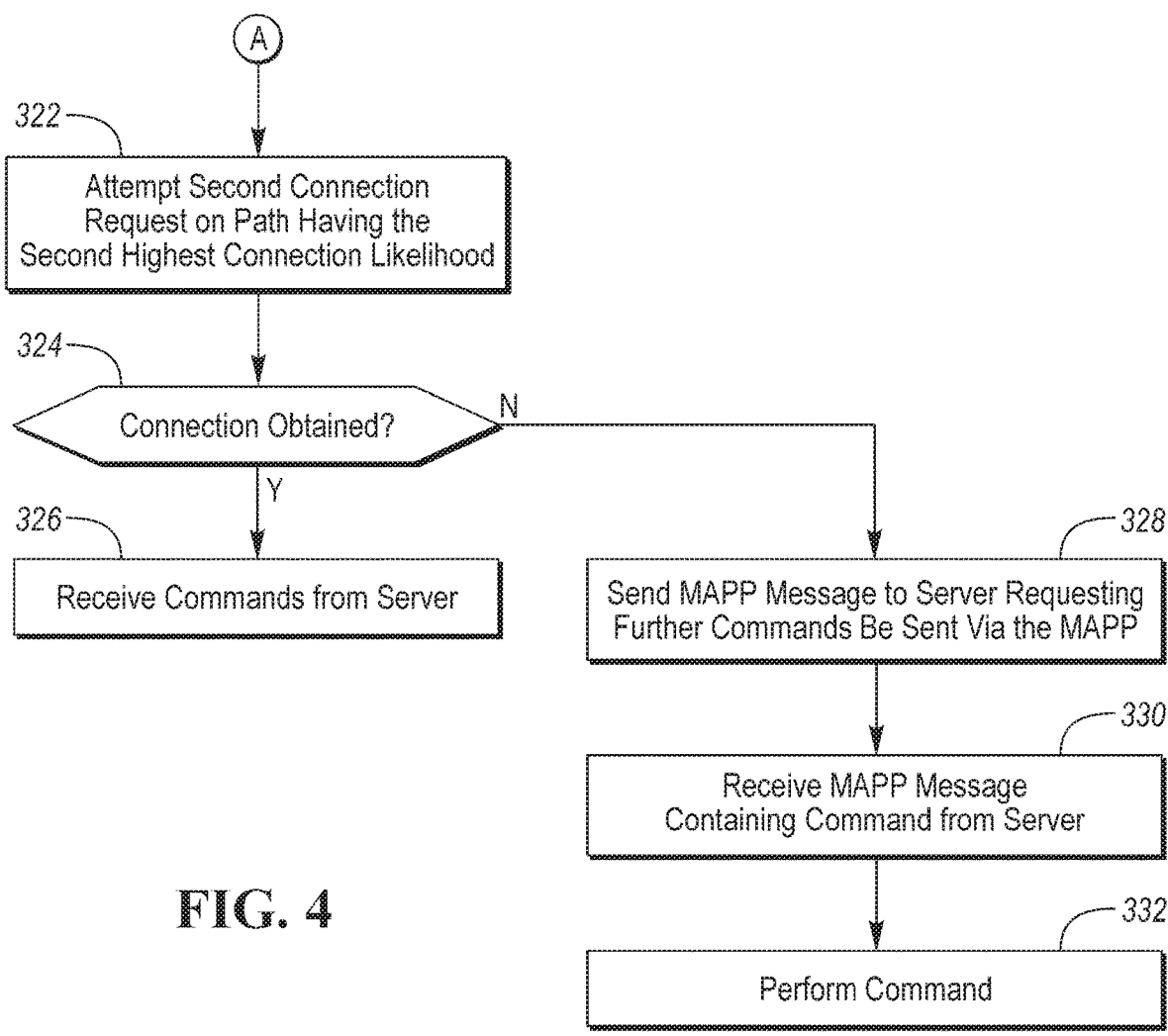
FIG. 4 illustrates an example process receiving a command over a mobile application part protocol.

FIGS. 3 and 4 illustrate a potential process for establishing a vehicle 102 and server 150 communications path. In step 302, the process starts. In step 304 the vehicle is parked autonomously or by an operator. In step 306, the vehicle is shutdown or turned off. In step 310 the server sends a request to wake up the vehicle. The wakeup request may be via packet-switched communications paths or circuit-switched communications paths. The request may also be over a signaling protocol (e.g., MAPP). In step 312, the vehicle 102 may assign RSSI and RSRP values to the potential communication paths 130, 132, 134 available to the vehicle 102. The highest connection likelihood may be determined using the methods above in step 314. The vehicle may attempt a first connection request on the path having the highest connection likelihood in step 316. In step 318, the vehicle 102 determines whether a valid communications path has been identified through the first connection request. The valid communications path may be recognized from messages received from a telecommunications base station, information from the server, or data validation errors. If a connection is obtained, the vehicle 102 receives additional commands from the server 150 in step 320.

If a connection is not obtained in step 318, the vehicle 102 may attempt a second connection request over a communications path having the second highest connection likelihood in step 322. In step 324, the vehicle 102 determines whether a valid communications path has been identified through the first connection request. If a connection is obtained, the vehicle 102 receives additional commands from the server 150 in step 326. If a connection is not obtained in step 324, the vehicle 102 sends a MAPP message to the server requesting further commands be sent via the mobile application part protocol in step 328. The server 150 may associate the connection path request with the vehicle 102 to differentiate between multiple vehicles. The server 150 may then send a MAPP message to the vehicle 102 containing a command to perform a vehicle operation in step 330. In step 332, the vehicle performs the command. Any of the steps listed above may be omitted or rearranged. For example, additional packet-switched connection paths may be tested before the MAPP request is sent. In other embodiments, various circuit-switched communication paths may be tested to determine the best circuit-switched communication path as well.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A control system for a vehicle comprising:
a controller configured to,
responsive to receiving a wakeup command message from a server;
attempt to establish a packet switched connection with the server using a communication path having a highest connection likelihood, based on received signal strength, set in response to a vehicle shutdown, and signal type of a connection type;
and being unable to establish the packet switched connection, having internet protocol signaling, with the server, send a mobile application part protocol (MAPP) message to the server requesting that further commands be sent via MAPP; and
responsive to receiving a MAPP message from the server containing a command to start the vehicle, start the vehicle.

2. The control system of claim 1, wherein the MAPP message further contains a command to change a lock position of the vehicle.

3. The control system of claim 1, wherein the command further includes an additional vehicle operation.

4. The control system of claim 1, wherein the packet switched connection uses long term evolution protocols.

5. The control system of claim 1, wherein the MAPP message is a short message service message.

6. The control system of claim 1, wherein the wakeup command message is a short message service message.

7. The control system of claim 1, wherein the protocol includes an encryption function.

8. The control system of claim 7, wherein the encryption function includes a handshake with the server.

9. The control system of claim 1, wherein the command is a set of commands.

10. The control system of claim 1, wherein the command is compressed to fit within a data unit length required by the protocol.

11. The control system of claim 1, wherein the protocol has a data unit length of 140 bytes.

12. A method comprising:
receiving a wakeup command from a remote server at a controller of a vehicle;
defining a connection likelihood for a plurality of packet switched communications paths based on a respective received signal strength, received for each communication path at vehicle shutdown prior to receiving the wake command and set for each connection at the shutdown, and signal type;
sending a first connection request using a first one of the plurality having a highest connection likelihood;
in response to being unable to establish a connection with the server over the first of the plurality, sending a second connection request using a second one of the plurality having a second highest connection likelihood;
in response to being unable to establish the connection with the server over the second of the plurality, sending a mobile application part protocol (MAPP) message to the server requesting that further commands be sent via MAPP;
receiving a MAPP message from the server containing a command to start the vehicle; and
starting the vehicle.

13. The method of claim 12, wherein the command is compressed to fit within a data unit length required by the protocol.

14. The method of claim 12, wherein the protocol has a data unit length of 140 bytes.

15. The method of claim 12, wherein a portion of a data unit including the command is encrypted.

16. A control system for a vehicle comprising:
a controller configured to,
responsive to receiving a message containing a wakeup command from a server;
attempt to establish a packet switched connection with the server using a communication path having a highest connection likelihood, based on received signal strength, set in response to a vehicle shutdown, and signal type of a connection type;
and being unable to establish the packet switched connection with the server, send a mobile application part protocol (MAPP) message to the server requesting that further commands be sent via MAPP; and
responsive to receiving a MAPP message from the server containing a command to unlock the vehicle, unlock the vehicle.

* * * * *